(12) United States Patent  (10) Patent No.: US 8,215,199 B2
Marcroft et al.  (45) Date of Patent: Jul. 10, 2012

(54) PARALLEL KINEMATIC POSITIONING SYSTEM

(76) Inventors: Sacha L. Marcroft, Newbury Park, CA (US); Andre' Perrin, Newbury Park, CA (US); Robert Domes, Newbury Park, CA (US); Marc Webster, Newbury Park, CA (US); Fred L. Ansaldi, Newbury Park, CA (US)

( * ) Notice: Subject to any disclaimer, the term of this patent is extended or adjusted under 35 U.S.C. 154(b) by 814 days.

(21) Appl. No.: 12/313,055

(22) Filed: Nov. 17, 2008

(65) Prior Publication Data

US 2010/0122602 A1 May 20, 2010

(51) Int. Cl.
G05G 11/00 (2006.01)

(52) U.S. Cl. .................... 74/490.08; 74/490.13

(58) Field of Classification Search .............. 74/490.01, 74/490.02, 490.03, 490.07–490.1; 472/130
See application file for complete search history.

(56) References Cited

U.S. PATENT DOCUMENTS

| | | | |
|---|---|---|---|
| 4,507,598 A * | 3/1985 | Wakabayashi et al. ....... 318/687 |
| 4,655,548 A | 4/1987 | Jue | |
| 4,790,718 A | 12/1988 | Vickers | |
| 4,819,496 A * | 4/1989 | Shelef .................... 74/490.03 |
| 4,988,244 A * | 1/1991 | Sheldon et al. ............ 409/132 |
| 5,028,180 A * | 7/1991 | Sheldon et al. ............ 409/201 |
| 5,279,176 A | 1/1994 | Tahmasebi et al. | |
| 5,333,514 A | 8/1994 | Toyama et al. | |
| 5,797,191 A | 8/1998 | Ziegert | |
| 5,836,083 A | 11/1998 | Sangwan | |
| 5,870,834 A | 2/1999 | Sheldon | |
| 5,987,726 A * | 11/1999 | Akeel ................... 29/407.08 |
| 6,021,579 A | 2/2000 | Schimmels et al. | |
| 6,236,451 B1 | 5/2001 | Wildenberg | |
| 6,239,516 B1 * | 5/2001 | Floresta et al. ........... 310/12.21 |
| 6,378,190 B2 * | 4/2002 | Akeel ................... 29/407.08 |
| 6,474,915 B1 | 11/2002 | Wildenberg | |
| 6,497,548 B1 | 12/2002 | Roy et al. | |
| 6,648,583 B1 | 11/2003 | Roy et al. | |
| 6,671,975 B2 * | 1/2004 | Hennessey ................. 33/645 |
| 6,769,194 B2 * | 8/2004 | Hennessey ................. 33/645 |
| 7,081,866 B2 * | 7/2006 | Gaechter .................. 343/880 |
| 7,124,660 B2 * | 10/2006 | Chiang ................... 74/490.05 |
| 7,148,646 B2 * | 12/2006 | Matsushita ............. 318/568.21 |
| 7,270,319 B2 | 9/2007 | Culpepper | |
| 7,997,161 B2 * | 8/2011 | Chablat et al. ........... 74/490.03 |
| 8,047,093 B2 * | 11/2011 | Kinoshita et al. ......... 74/490.03 |
| 2004/0004405 A1 * | 1/2004 | Ausderau .................. 310/12 |
| 2007/0113700 A1 * | 5/2007 | Khajepour et al. ....... 74/490.03 |
| 2011/0192246 A1 * | 8/2011 | Li et al. .................. 74/490.03 |

* cited by examiner

*Primary Examiner* — Justin Krause
*Assistant Examiner* — Matthew R Vaerewyck
(74) *Attorney, Agent, or Firm* — Albert O. Cota

(57) ABSTRACT

A parallel kinematic positioning system 10 (PKPS 10) that is comprised of a stationary base plate (12) and an upper movable platform (28) to which is attached a workpiece or an instrument. Between the stationary base plate (12) and the upper movable platform (28) are positionally attached six strut assemblies (50). The six strut assemblies operate a hexapod that include in combination, a counterbalance subassembly (111), a servo motor subassembly (134), a bearing and encoder subassembly (156) and an electronics circuit (190). The combination accurately and repeatably positions the upper movable platform (28) within six degrees of freedom relative to the base plate (12).

3 Claims, 8 Drawing Sheets

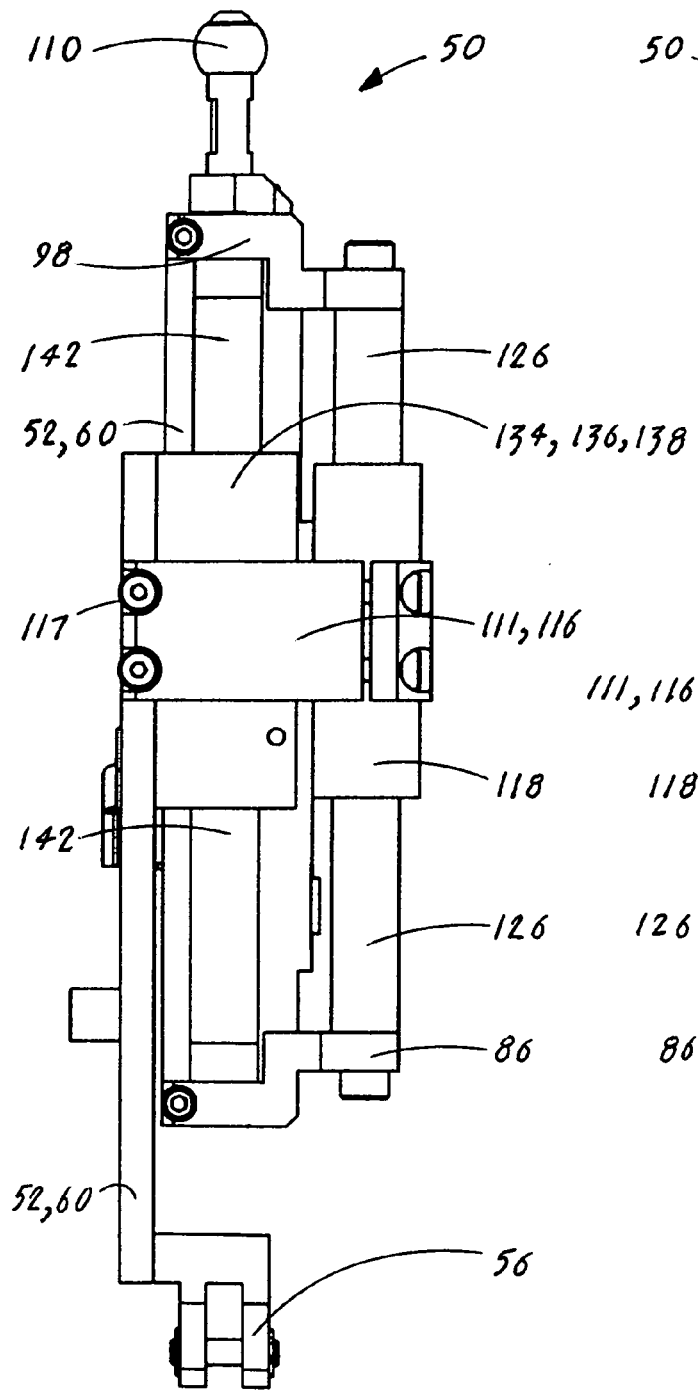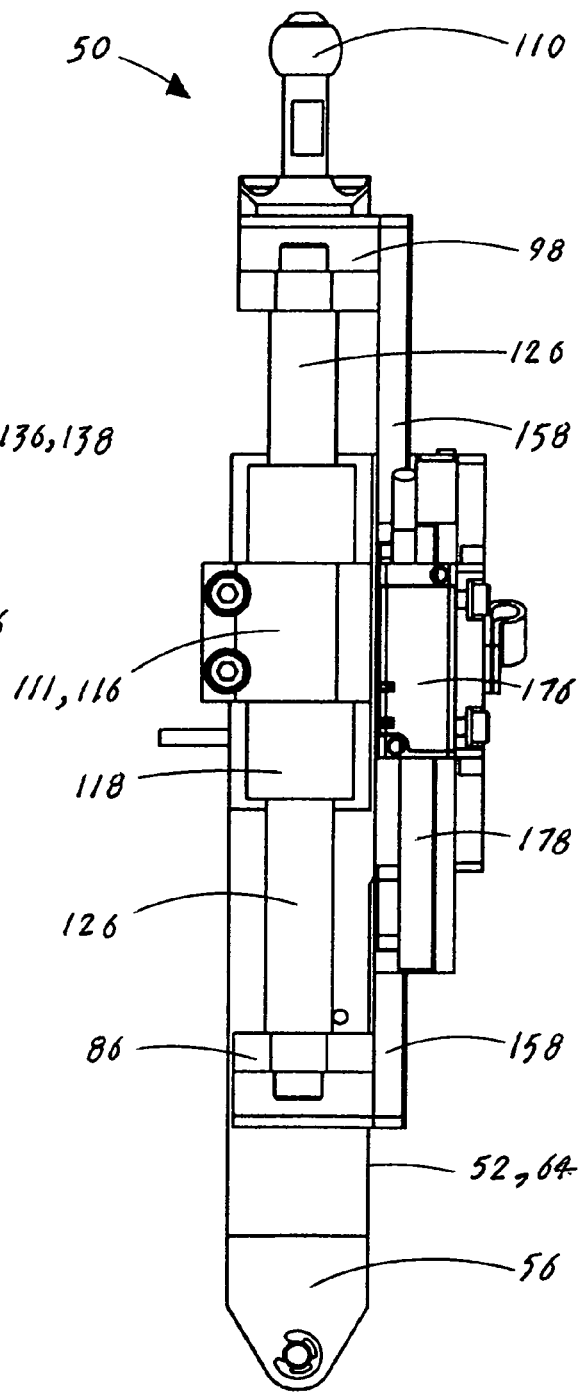
Fig. 6
Fig. 7

PARALLEL KINEMATIC POSITIONING SYSTEM

TECHNICAL FIELD

The invention generally pertains to parallel manipulation devices, and more particularly to a parallel kinematic positioning system that utilizes a plurality of strut assemblies to control the angular position of an upper movable platform within six-degrees of freedom relative to a base plate.

BACKGROUND ART

Typical parallel manipulation systems are comprised of a stationary lower base plate and an upper movable platform. The platform is utilized to mount a workpiece or an instrument that is attached to the base by a plurality of strut assemblies that are positionally controlled by means of motor-driven linear actuators which, in turn, are controlled by an electronics circuit.

If the system utilizes six struts it is referred to as a hexapod. The hexapod allows the upper movable platform to be displaced within six degrees of freedom relative to the stationary lower base plate. The six degrees of freedom include three translational movements and three rotational movements.

Prior art hexapods typically utilize actuators that are operated by servo motors, stepper motors, linear piezoelectric motors, and inch-worm type motors. The stepper motors in conjunction with a ball or lead screw can produce a backlash that adversely affects the selected length of the struts, linear piezoelectric motors can produce a vibration that can affect the positioning of the struts, and the inch-worm type motors can produce hysteresis that can affect the accuracy and repeatability of the hexapod.

The parallel kinematic positioning system disclosed in the instant application eliminates or at least minimizes the above listed problems by utilizing an ironless-core, linear-shaft servo motor that operates in combination with a magnetic load counterbalance.

A search of the prior art did not disclose any literature or patents that read directly on the claims of the instant invention. However, the following U.S. patents are considered related:

| U.S. Pat. No. | INVENTOR | ISSUED |
| --- | --- | --- |
| 6,769,194 | Hennessey | 6 Jan. 2004 |
| 6,474,915 | Wildenberg | 5 Nov. 2002 |
| 5,279,176 | Tahmasebi et al | 18 Jan. 1994 |
| 4,819,496 | Shelef | 11 Apr. 1989 |

The U.S. Pat. No. 6,769,194 discloses a method and an apparatus for providing nanometer precision motion. The apparatus includes a parallel kinematic micromanipulator that is formed using at least three or six kinematic links. The kinematic links include a high resolution, non-contact encoder that provides position information. Movement of the micromanipulator is effected using piezoelectric linear actuators that connect with each of the kinematic links. The combination of the parallel kinematic structure and the piezoelectric linear actuators provide three or six degrees of freedom.

The U.S. Pat. No. 6,474,915 discloses a hexapod that is used to position a tool with respect to a part that is to be machined. The hexapod includes two spaced plates that are interconnected by six articulated and extensible legs. The two plates, including a base plate and a mobile plate and the six legs, are joined for varying the relative position of the mobile plate with respect to the base plate. The hexapod further includes a device for reducing stress on the elements that comprise the hexapod.

The U.S. Pat. No. 5,279,176 discloses a six-degree of freedom parallel-manipulator having three inextensible limbs that are attached to and manipulate a platform via universal joints. Each of the inextensible limbs are attached via universal joints to a two-degree of freedom parallel driver such as a five-bar lineage, a pantograph, or a bidirectional linear stepper motor. The drivers move the lower ends of the limbs parallel to a fixed base and thereby manipulate the platform.

The U.S. Pat. No. 4,819,496 discloses a six degree of freedom micromanipulator assembly that is interposed between the fingers and the arms of a robotics structure. The accuracy of the assembly depends upon the position of the fingers relative to the arms of the assembly.

For background purposes and as indicative of the art to which the invention relates, reference may be made to the following remaining patents found in the search:

| U.S. Pat. No. | INVENTOR | ISSUED |
| --- | --- | --- |
| 7,270,319 | Culpepper | 18 Sep. 2007 |
| 7,148,646 | Matsushita | 12 Dec. 2006 |
| 7,081,866 | Gaechter | 25 Jul. 2006 |
| 6,671,975 | Hennessey | 6 Jan. 2004 |
| 6,648,583 | Roy et al | 18 Nov. 2003 |
| 6,497,548 | Roy et al | 24 Dec. 2002 |
| 6,236,451 | Wildenberg | 22 May 2001 |
| 6,021,579 | Schimmels et al | 8 Feb. 2000 |
| 5,870,834 | Sheldon | 16 Feb. 1999 |
| 5,836,083 | Sangwan | 17 Nov. 1998 |
| 5,797,191 | Ziegert | 25 Aug. 1998 |
| 5,333,514 | Toyama et al | 2 Aug. 1994 |
| 5,028,180 | Sheldon et al | 2 Jul. 1991 |
| 4,988,244 | Sheldon et al | 29 Jan. 1991 |
| 4,790,718 | Vickers | 13 Dec. 1988 |
| 4,655,549 | Jue | 7 Apr. 1987 |

DISCLOSURE OF THE INVENTION

The parallel kinematic positioning system (PKPS) allows a workpiece or an instrument to be precisely attached and positioned with a high repeatability, low tolerances and within six degrees of freedom. In its basic design configuration the PKPS is comprised of:

A. A stationary base plate having an inner surface and an outer surface,

B. An upper movable platform having an inner surface and an outer surface and that is designed to have attached and positioned workpiece or instrument, C. A plurality of strut assemblies that are positionally attached between the stationary base plate and the upper movable platform. The plurality of strut assemblies each have an upper end, a lower end, and are designed to selectively control the position of the upper platform relative to the base plate, and D. An electronics circuit having means for selecting and controlling the position of the plurality of strut assemblies.

The plurality of strut assemblies can range from three to a larger number that is dependent upon the relative sizes of the stationary base plate and the upper movable platform. However, for brevity the disclosure that follows will be limited to six strut assemblies which create a PKPS that is referred to as a hexapod. The hexapod provides the upper platform with six degrees of freedom, namely three translations in the three axes (x, y and z) and three rotational axes that correspond to roll, pitch and jaw.

When utilizing the hexapod, the base plate is rigidly attached to a substantially flat working surface such as a work bench, and the upper movable platform has an upper surface that is specifically configured to temporarily allow a particular workpiece or instrument to be attached thereto. Further, the planer shape of the base plate and the movable platform can be configured in various polygonal shapes or a circular shape as best suited to accommodate the workpiece or the instrument.

In view of the above disclosure, the primary object of the invention is to produce a PKPS that allows a workpiece or an instrument to be precisely and easily attached to an upper movable platform that can be adjusted to within six degrees of freedom relative to a stationary base plate.

In addition to the primary object of the invention it is also an object of the invention to produce a PKPS that:
 can be produced with various quantities of strut assemblies which typically range from three to six strut assemblies,
 can be dimensioned to accommodate various sizes of workpieces and instruments,
 has a high reliability and a low preventive maintenance cycle,
 allows precise alignment and resolution of the workpiece or instrument,
 employs high speed, high precision ironless core linear servo motors, and
 employs a counterbalance that functions in combination with the servo motors to enhance performance and safety in case there is an interruption or loss of power.

These and other objects and advantages of the instant invention will become apparent from the subsequent detailed description of the preferred embodiment and the appended claims taken in conjunction with the accompanying drawings.

BRIEF DESCRIPTION OF THE DRAWINGS

FIG. 2 also shows the base plate of the hexapod attached to a substantially flat surface.

FIG. 6 is a front elevational view of a hexapod strut assembly.

FIG. 7 is a side elevational view of a hexapod strut assembly.

BEST MODE FOR CARRYING OUT THE INVENTION

Figure 10:
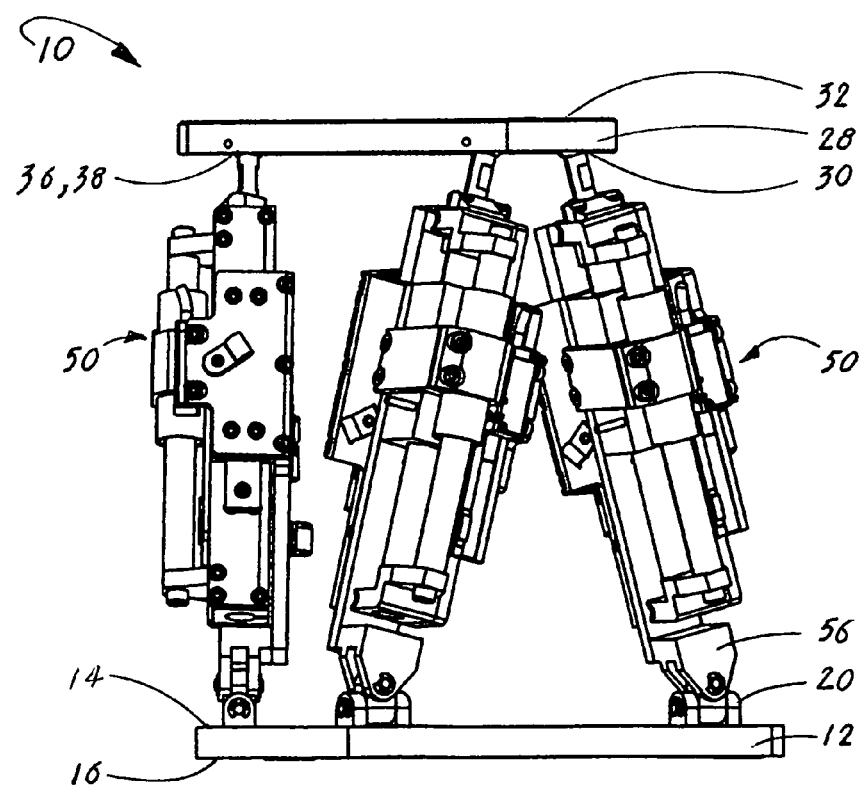
FIG. 10 is a side elevational view of a variation of the invention in which three strut assemblies are utilized instead of the conventional six struts.

The best mode for carrying out the invention is presented in terms of a preferred embodiment for a parallel kinematic positioning system 10 (PKPS 10). The preferred embodiment of the PKPS 10, as shown in FIGS. 1-9, is comprised of four major elements: a stationary base plate 12, an upper movable platform 28, a strut assembly 50 and an electronics circuit 190. The preferred embodiment is defined as a hexapod which utilizes six strut assemblies 50 that in combination, control a selected position of the upper movable platform 28 within six degrees of freedom relative to the stationary base plate 12. Although six strut assemblies are preferred, alternate designs can include additional struts (not shown) or as little as three struts, as shown in FIG. 10.

The base plate 12, as shown in FIGS. 1-4, is comprised of an inner surface 14 and an outer surface 16. The inner surface 14, as shown best in FIGS. 1-3, includes a plurality of base attachment structures 18 that can consist of a bifurcated attachment tab 20 that movably interfaces with a bifurcated structure 56 which is located on the lower end 54 of the strut assemblies 50 as described infra, or a U-joint ball receptor 22, as also described infra.

Figure 1:
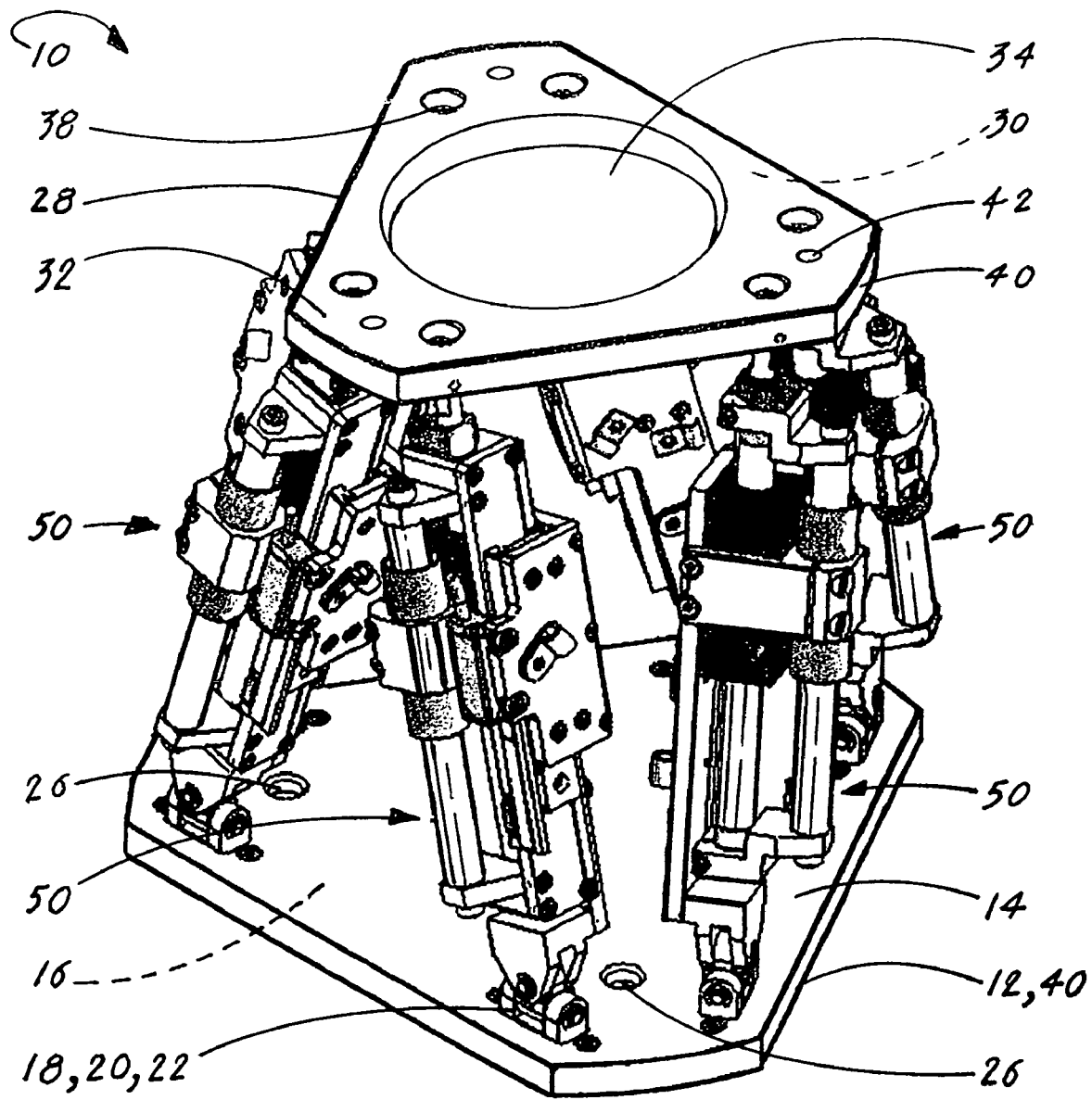
FIG. 1 is a perspective view of an assembled PKPS configured as a hexapod.
Figure 2:
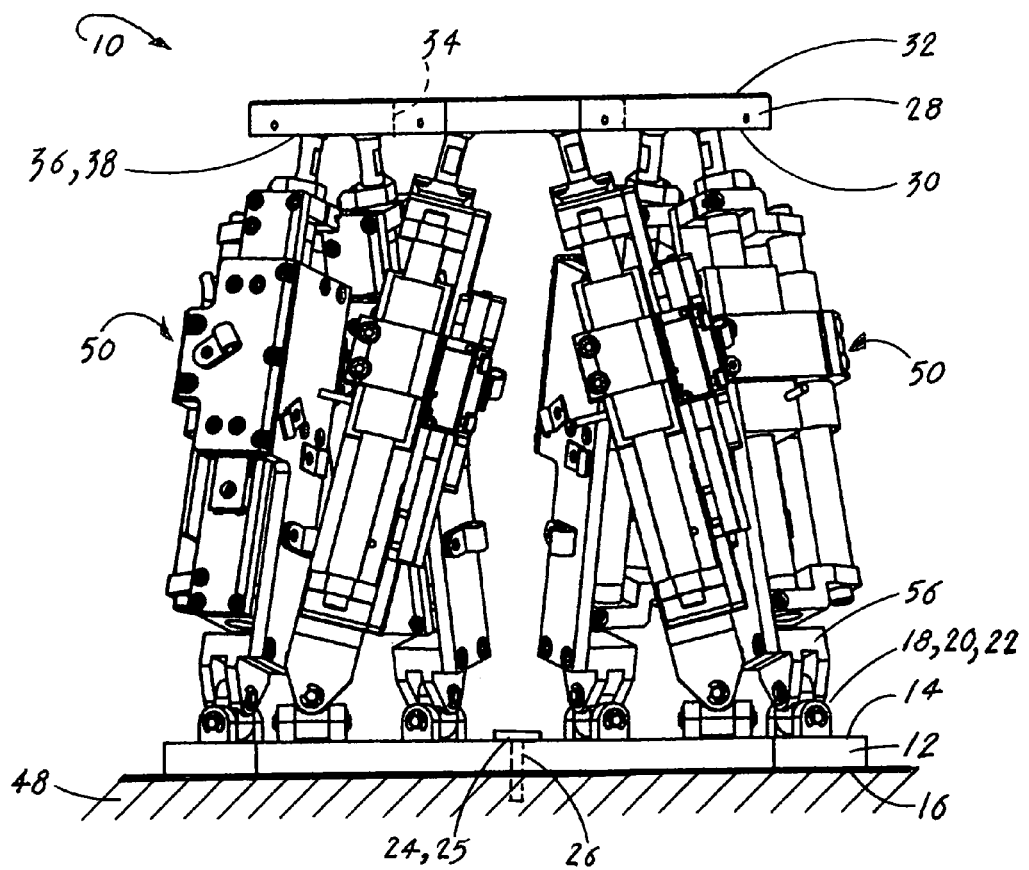
FIG. 2 is a side elevational view of the hexapod showing an upper movable platform substantially parallel relative to a stationary base plate.
Figure 3:
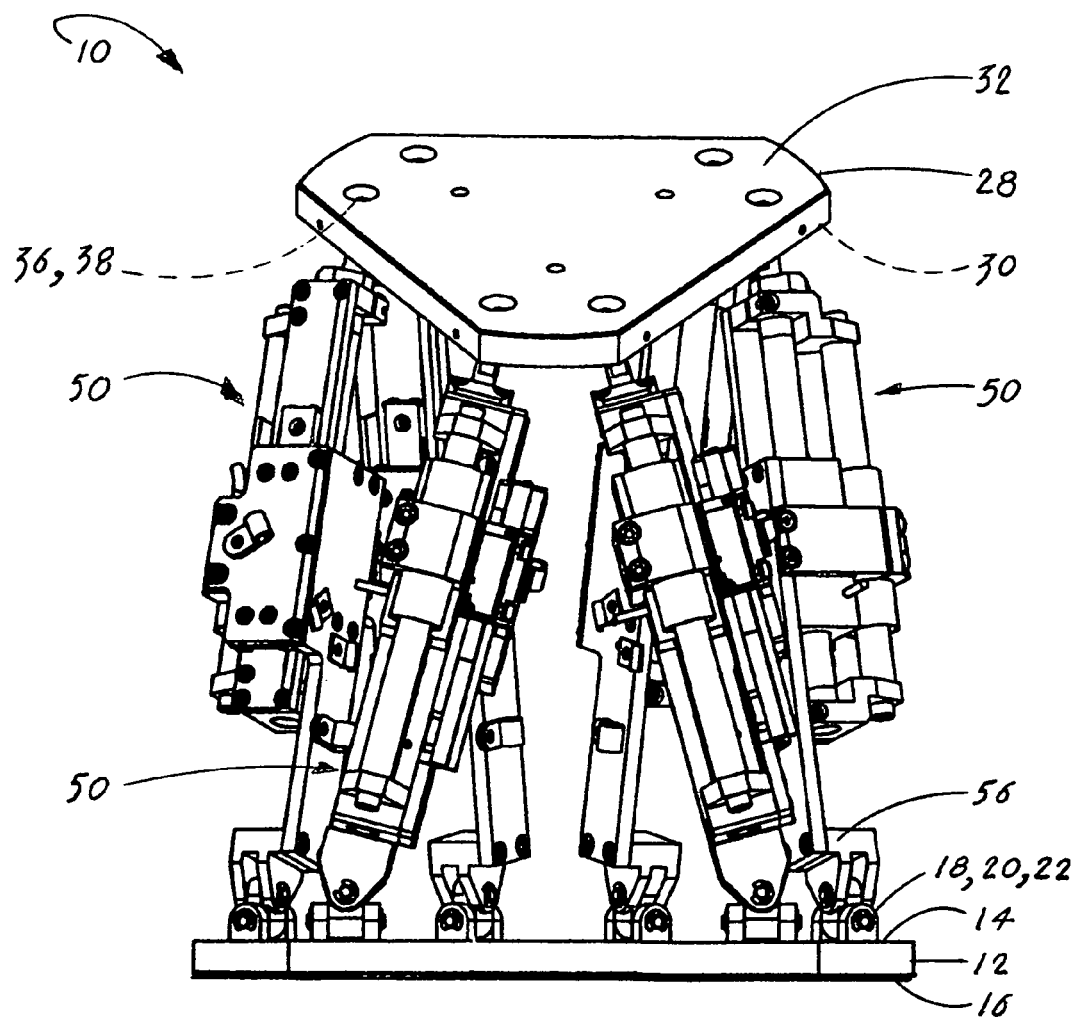
FIG. 3 is a side elevational view of the hexapod showing the upper movable platform tilted relative to the stationary base plate.
Figure 4:
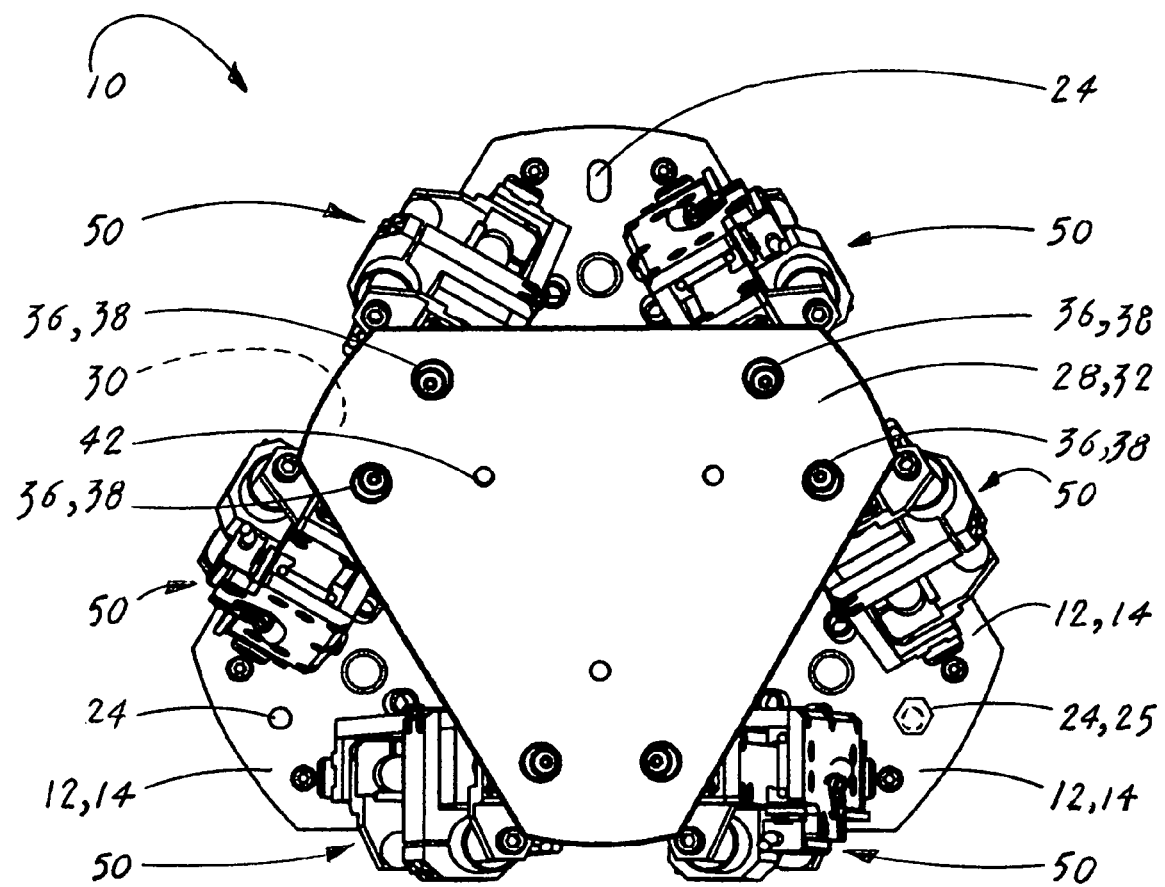
FIG. 4 is a top plan view of the hexapod.

The base plate 12 also includes a base plate attachment means 24 for being rigidly attached to a substantially flat surface 48, as shown in FIG. 2. The plate attachment means 24 preferably consists of the base plate 12 having a plurality of attachment bores 26 that are dimensioned to receive a plurality of bolts 25 that attachably interface with the substantially flat surface 48. The base plate can be designed to have various planer surfaces such as a corner-truncated triangular shape 40, as shown in FIGS. 1-4.

The upper movable platform 28, as shown in FIGS. 1-4, includes a like plurality of platform attachment structures 36 that preferably consist of U-joint ball receptors 38 that rotatably interface with a corresponding U-joint ball 110 located on the upper end 58 of each strut assembly 50.

The upper movable platform 28 can also be configured to have various planer surface shapes such as the corner-truncated triangular shape 40, as shown in FIGS. 1-4, or a circular shape (not shown). In which ever shape is selected, the upper movable platform 28 includes an inner surface 30, an outer surface 32 and can include an opening 34, as shown in FIG. 1, that facilitates the attachment and the adjustment of a particular workpiece or instrument (neither shown) that is attached to the outer surface 32 of the platform 28. As shown in FIGS. 1-4, the upper movable platform 28 can be manufactured in a configuration that is best suited to interface with the desired workpiece or tool that is to be attached to the PKPS 10. Additionally, the base plate 12 can be dimensioned to have a surface area that is greater than, less than or equal to the surface area of the upper movable platform 28.

The six strut assemblies 50 that operate the PKPS 10 are positionally located between the stationary base plate 12 and the upper movable platform 28. The strut assemblies 50, in combination, control the position of the upper movable platform 28 within six degrees of freedom relative to the stationary base plate 12. The strut assemblies 50 are shown attached to the stationary base plate 12 and the upper movable platform 28 in FIGS. 1-4, and each strut assembly 50 is shown removed from the PKPS 10 in FIGS. 5-8.

Each strut assembly 50 is comprised of nine major components: a trunnion plate 52, a union plate 74, a lower counterbalance and coil clamp 86, an upper counterbalance and coil clamp 98, a counterbalance subassembly 111, a counterbalance split clamp 112, a servo motor subassembly 136, and a bearing and encoder subassembly 156.

Figure 5:
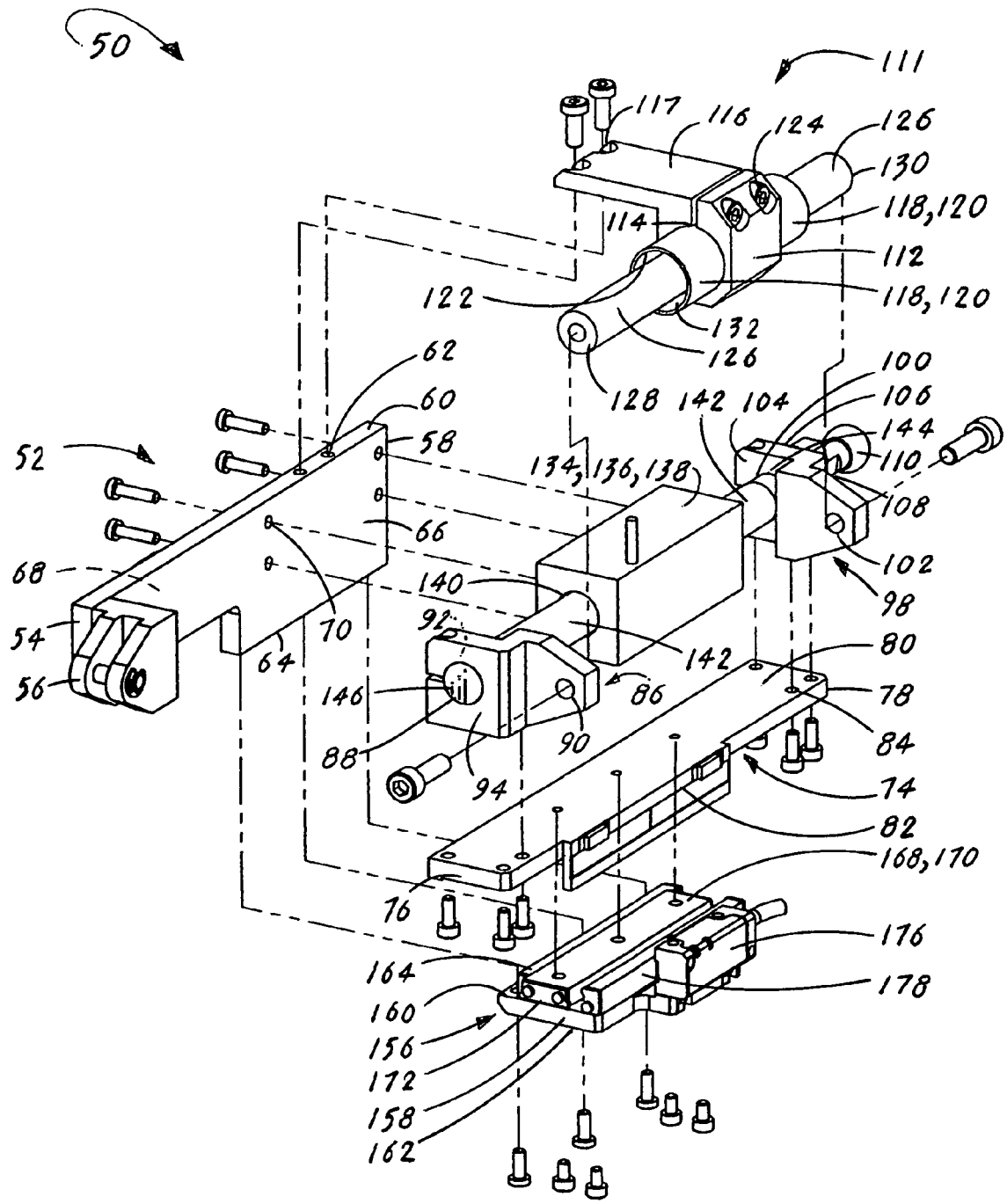
FIG. 5 is an exploded view of one of the strut assemblies that is utilized by the hexapod.
Figure 8:
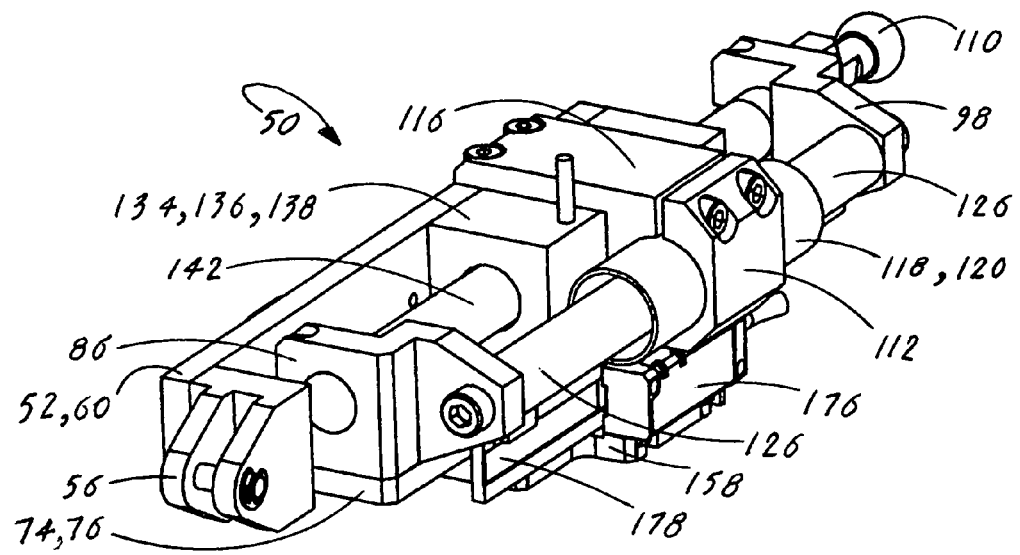
FIG. 8 is a perspective view of a hexapod strut assembly.

The trunnion plate 52, as shown best in FIG. 5, is comprised of a lower end 54 and an upper end 58. The lower end 54 in the preferred embodiment is configured as a bifurcated structure 56. The structure 56 is rotatably pinned to the corresponding base attachment structure 18 which is configured as a bifurcated attachment tab 20 that extends from the inner surface 14 of the stationary base plate 12. Although a bifurcated structure 56 is preferred, a universal joint selected from the group consisting of a ball and socket U-joint, a single U-joint, a double U-joint, a pin and block U-joint and a needle bearing U-joint can also be utilized. If a U-joint is utilized, the base attachment structure 18 is comprised of a U-joint ball receptor 22. The trunnion plate 52 also has a first edge 60 having a set of clamp mounting bores 62, a second edge 64 that is located opposite the first edge 60, an inner surface 66, and an outer surface 68 having a set of coil mounting bores 70 that protrude through the outer surface 68.

The union plate 74, as also shown best in FIG. 5, is comprised of a lower end 76, an upper end 78, an inner surface 80 and an outer surface 82. The outer surface has a set of bearing mounting bores 84 that extend through the inner surface 80.

The lower counterbalance and coil clamp 86, as also shown best in FIG. 5, is comprised of a lower motor shaft bore 88, a magnetic shaft bore 90, an inner surface 92 and an outer surface 94. Likewise, the upper counterbalance and coil clamp 98 has an upper motor shaft bore 100, a magnetic shaft bore 102, an inner surface 104, an outer surface 106, and a universal joint mounting structure 108 that is attached to the outer surface 106. The mounting structure 108 is dimensioned to rotatably accept the U-joint ball 110 that is attached to the upper end 58 of the strut assembly 50.

The counterbalance subassembly 111, as shown best in FIG. 5, is comprised of a counterbalance split clamp 112, a counterbalance sleeve 118 and a magnetic shaft 126. The counterbalance split clamp 112 has a sleeve opening 114 and a clamp mounting tab 116. The mounting tab 116 is attached by means of bolts that are inserted through a set of tab mounting bores 117 that are located on the clamp mounting tab 116 and a set of clamp mounting bores 62 that are located on the first edge 60 of the trunnion plate 52.

The counterbalance sleeve 118 is made of a highly ferrous material and includes an outside diameter 120 and an inside diameter 122. The outside diameter 120 of the sleeve 118 is dimensioned to be rigidly clamped within the sleeve opening 114 by a pair of clamp bolts 124, as shown in FIG. 5.

The magnetic shaft 126 has a lower end 128 and an upper end 130. The lower end 128 is attached by a bolt that is inserted into the magnetic shaft bore 90 on the lower counterbalance and coil clamp 86. The upper end 130 is attached by a bolt that is inserted into the magnetic shaft bore 102 located on the upper counterbalance and coil clamp 98. The magnetic shaft 126 has a diameter that allows the shaft 126 to be concentrically maintained within an air gap 132 that is located adjacent to the inside diameter 122 of the counterbalance sleeve 118.

The counterbalance subassembly 111 preferably utilized in the PKPS 10 can be selected from a group consisting of a magnetic counterbalance such as sold under the trademark MagSpring™, an air spring, an active air actuator, a constant-force spring, a pulley type counterbalance, and an air cylinder, The MagSpring™ counterbalance subassembly 111 is preferred because it provides:

A. A non-contact surface,

B. Counterbalancing of the workpiece or instrument so that relatively small linear servo motors 136 can be utilized, particularly in vertical applications, C. Retraction of the linear servo motor 136 and the workpiece or the instrument in the event of a power loss or an E-stop condition, and D. An assisting means for the linear servo motor 136 in applications that require a high force in one direction and a low force in the opposite direction. The assisting means is accomplished by having the linear servo motor 136 load the MagSpring™ counterbalance assembly 111 while moving in a low force direction.

The counterbalance subassembly 111 is designed and dimensioned to overcome the force of gravity and the load (W) that is attached to the outer surface 32 of the upper movable platform 28. A rough calculation for selecting a magnetic counterbalance follows:

W=Load (workpiece or instrument).
Wt=Load attached to the upper platform.
a=Strut angle.
x=Number of strut assemblies.

Strut counterbalance force=$((W+Wt)/x)*\sin(a)$

For example, if in a hexapod configuration W=10 lb, Wt=1 lb and the strut assembly angle is in a worst case 90 degrees: (11 lb/6=1.833 lbs, 1.833 lbs*sine 90=1.833 lb counterbalance per each strut assembly 50.

If the strut angle is 45 degrees: 1.833 lbs*sine 45=1.29 lbs counterbalance per each strut assembly 50. In this instance 1.833 lbs is a worst case situation therefore, a 2 lb range would be selected to allow the hexapod to slightly extend when power is lost.

There are two main reasons for using a counterbalance subassembly 111 in a predominantly frictionless PKPS 10. The first reason is the relative safety that is available during an interruption or a complete loss of electrical power and also to aid the linear servo motor 136 in the direction opposite that of gravity. Safety can be defined in many ways, however in the case of a hexapod using light loads and highly precise instrumentation, safety would be relative to the load attached to the upper movable platform 28. When heavy industrial loads are attached to the platform 28, safety would be related to personnel and body pinch points. In summary, the counterbalance subassembly 111 is utilized to counteract the force of gravity and to keep the upper movable platform 28 from falling during an interruption or a loss of electrical power.

The second reason is that by counteracting gravity, the counterbalance assembly 111 also allows the use of a non-contact iron or ironless linear servo motors in a vertical application. Additionally, to allow the use of linear servo motors 136 in a PKPS 10 application, the counterbalancing technique allows smaller linear servo motors 136 to be used with the PKPS 10.

The servo motor subassembly 134, as shown best in FIG. 5, is comprised of a linear servo motor 136 that utilizes an ironless motor coil 138 having a shaft opening 140 therethrough and a magnetic motor shaft 142. Note that an ironcore linear shaft and non-shaft servos can be used as well. The shaft 142, which is inserted into the shaft opening 140, has an upper end 144 and a lower end 146. The upper end 144, as also shown in FIG. 5, is inserted into the upper motor shaft bore 100 which is located on the upper counterbalance and coil clamp 98. Likewise, the lower end 146 is inserted into the lower motor shaft bore 88 which is located on the lower counterbalance and coil clamp 86. The frictionless linear servo motor 136 is designed to provide a smooth velocity from a few microns per second to speeds of five meters per second and higher, and with the exception of the bearing surface, there is no appreciable surface contact.

The bearing and encoder subassembly 156, as shown in FIG. 5, is comprised of an encoder bearing plate 158, a flat linear bearing 168 and an encoder 176 that interfaces with an encoder tape 178. The encoder bearing plate 158 has an inner surface 160 to which is attached the encoder 176, an outer surface 162 and an inner slot 164. The inner slot 164 is dimensioned to slideably accept and maintain the second edge 64 located on the trunnion plate 52.

The linear bearing 168 can be selected from the group consisting of a flat linear bearing, a linear ball-bushing shaft bearing, profile rails, crossed roller bearings, a ball spline, bushings, cam style bearing assemblies and v-cam style bearing assemblies. The bearing material can be selected from various materials including Frelon™, Frelon Gold™ and Teflon™. The types of bearing and loading used is dependent upon the appreciation of the PKPS 10. The linear bearing 168 has an inner surface 170 and an outer surface 172. The outer surface 172 interfaces with the inner surface 160 of the encoder bearing plate 158. Likewise, the inner surface 170 interfaces with the outer surface 82 of the union plate 74.

The encoder 176, which can consist of either a magnetic encoder or an optical encoder, is designed to translate the angular position of the magnetic motor shaft 142 that is attached to the linear servo motor 136 into a series of digital signals that are processed by the electronics circuit 190 as described infra. The encoder 176, as also shown in FIG. 5, is located adjacent to the flat linear bearing 168 and is attached to the inner surface 160 of the encoder bearing plate 158.

Figure 9:
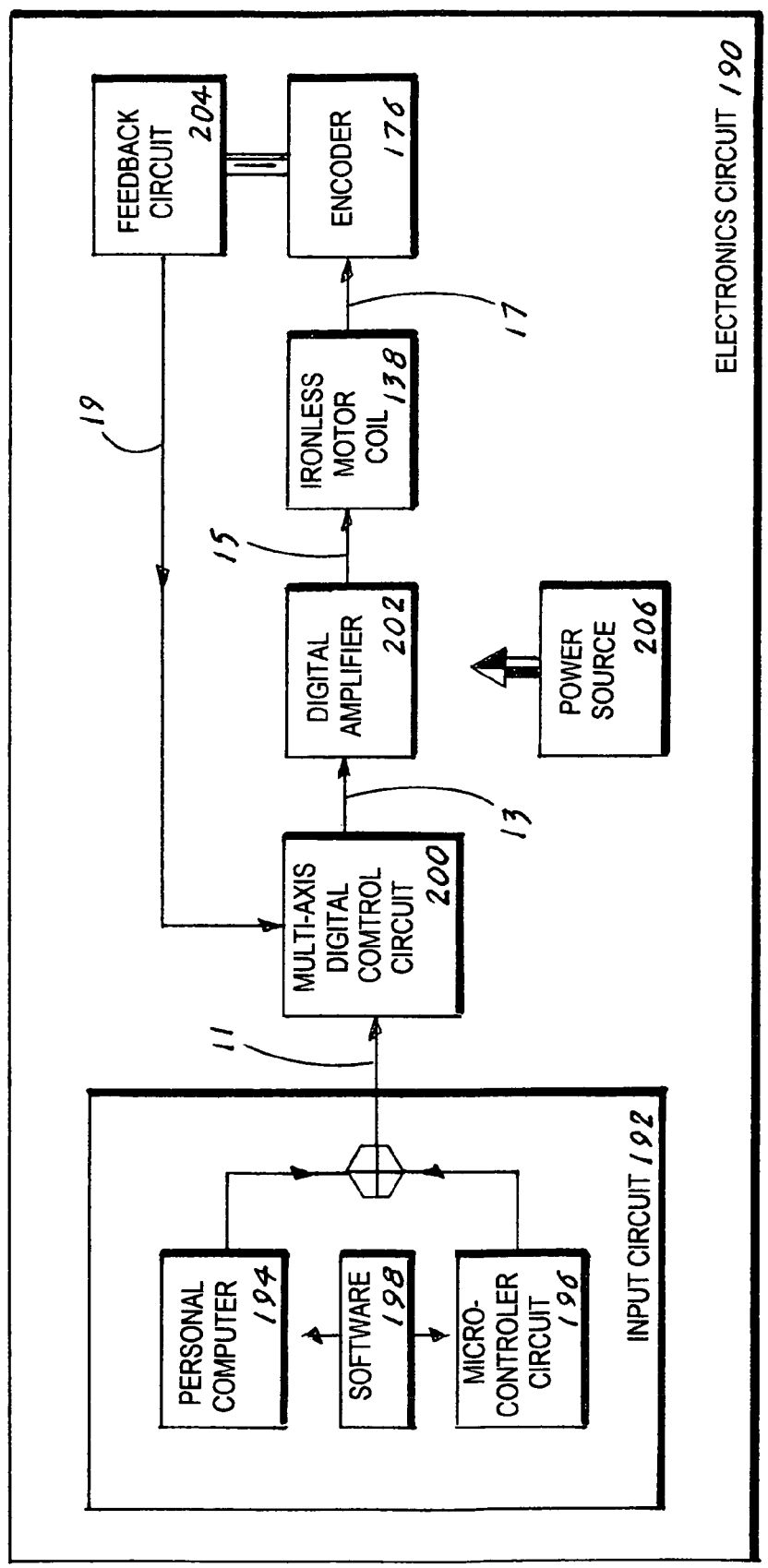
FIG. 9 is a block diagram of a typical electronic circuit that can be utilized to operate the PKPS.

To operate the PKPS 10 the electronics circuit 190 which is controlled by software 198 is utilized. A typical electronics circuit 190, as shown in FIG. 9, is comprised of an input circuit 192, a multi-axis digital control circuit 200, a digital amplifier 202, a feedback circuit 204 and a power source 206.

The input circuit 192 can consist of either a personal computer 194 or a microcontroller circuit 196. Either selection is operated by software 198 of which several versions are available in the prior art. From the input circuit 192 a first output signal 11 is produced that is applied to and processed by the multi-axis digital control circuit 200.

From the circuit 200 is produced a second output signal 13 that is amplified by a digital amplifier 202 that produces an amplified third output signal 15. The signal 15 is applied to the ironless motor coil 138, which is an element of the linear servo motor 136. From the ironless motor coil 138, a fourth output signal 17 is applied to the encoder 176 that interfaces with the feedback circuit 204 from where a feedback signal 19 is developed that is applied to the multi-axis digital circuit 200. The electronics circuit 190 is powered by a power source 206 that produces the required power levels to operate the PKPS 10.

Note that for brevity, the above description of the electronics circuit 190 is applicable to only one channel. When operating a hexapod six similar channels would be required.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

PARALLEL KINEMATIC POSITIONING SYSTEM

Element Designation

For Convenience of the Examiner, Not Part of the Specification

| | |
|---|---|
| 10 | Parallel Kinematic Positioning System (PKPS) |
| 12 | Stationary Base Plate |
| 14 | Inner Surface |
| 16 | Outer Surface |
| 18 | Base Attachment Structure |
| 20 | Bifurcated Attachment Tab |
| 22 | U-Joint Ball Receptor |
| 24 | Base Plate Attachment Means |
| 25 | Bolts |
| 26 | Attachment Bores |
| 28 | Upper Movable Platform |
| 30 | Inner Surface |
| 32 | Outer Surface |
| 34 | Opening |
| 36 | Platform Attachment Structure |
| 38 | U-Joint Ball Receptor |
| 40 | Corner-Truncated Triangular Shape |
| 42 | Workpiece Attachment Means |
| 44 | |
| 46 | |
| 48 | |
| 50 | Strut Assembly |
| 52 | Trunnion Plate |
| 54 | Lower End |
| 56 | Bifurcated Structure |
| 58 | Upper End |
| 60 | First Edge |
| 62 | Clamp Mounting Bores |
| 64 | Second Edge |
| 66 | Inner Surface |
| 68 | Outer Surface |
| 70 | Coil Mounting Bores |
| 72 | |
| 74 | Union Plate |
| 76 | Lower End |
| 78 | Upper End |
| 80 | Inner Surface |
| 82 | Outer Surface |
| 84 | Bearing Mounting Bores |
| 86 | Lower Counterbalance & Coil Clamp |
| 88 | Lower Motor Shaft Bore |
| 90 | Magnetic Shaft Bore |
| 92 | Inner Surface |
| 94 | Outer Surface |
| 96 | |
| 98 | Upper Counterbalance & Coil Clamp |
| 100 | Upper Motor Shaft Bore |
| 102 | Magnetic Shaft Bore |
| 104 | Inner Surface |
| 106 | Outer Surface |
| 108 | Universal Joint Mount. Struct. |
| 110 | U-Joint Ball |
| 111 | Counterbalance Subassembly |
| 112 | Counterbalance Split Clamp |
| 114 | Sleeve Opening |
| 116 | Clamp Mounting Tab |
| 117 | Tab Mounting Bores |
| 118 | Counterbalance Sleeve |
| 120 | Outside Diameter |
| 122 | Inside Diameter |
| 124 | Clamp Bolts |
| 126 | Magnetic Shaft |
| 128 | Lower End |
| 130 | Upper End |
| 132 | Air Gap |
| 134 | Servo Motor Subassembly |
| 136 | Linear Servo Motor |
| 138 | Ironless Motor Coil |
| 140 | Shaft Opening |

-continued

| | |
|---|---|
| 142 | Magnetic Motor Shaft |
| 144 | Upper End |
| 146 | Lower End |
| 148 | |
| 150 | |
| 152 | |
| 154 | |
| 156 | Bearing and Encoder Subassembly |
| 158 | Encoder Bearing Plate |
| 160 | Inner Surface |
| 162 | Outer Surface |
| 164 | Inner Slot |
| 166 | |
| 168 | Flat Linear Bearing |
| 170 | Inner Surface |
| 172 | Outer Surface |
| 174 | |
| 176 | Encoder |
| 178 | Encoder Tape |
| 180 | |
| 182 | |
| 184 | |
| 186 | |
| 188 | |
| 190 | Electronics Circuit |
| 192 | Input Circuit |
| 194 | Personal Computer |
| 196 | Microcontroller |
| 198 | Software |
| 200 | Multi-Axis Dig. Con Circuit |
| 202 | Digital Amplifier |
| 204 | Feedback Circuit |
| 206 | Power Source |
| 11 | First Output Signal |
| 13 | Second Output Signal |
| 15 | Third Output Signal |
| 17 | Fourth Output Signal |
| 19 | Feedback Signal |

The invention claimed is:

1. A parallel kinematic positioning system comprising:
   A. a stationary base plate having:
      (1) an inner surface and an outer surface, wherein the inner surface has a plurality of base attachment structures, and
      (2) means for being rigidly attached to a flat surface,
   B. an upper movable platform having:
      (1) an inner surface and an outer surface, wherein the inner surface further having a like plurality of platform attachment structures, and
      (2) an opening that facilitates the attachment and adjustment of a workpiece or instrument that is attached to the outer surface,
   C. a set of six strut assemblies that are each positionably located between said stationary base plate and said upper movable platform, wherein said strut assemblies in combination control the position of said upper platform within six degrees of freedom relative to the base plate, wherein each said strut comprises:
      a) a trunnion plate having:
         (1) a lower end configured as a bifurcated structure that is rotatably pinned to a corresponding base attachment structure which is located on the upper surface of said stationary base plate,
         (2) an upper end,
         (3) a first edge having a plurality of clamp mounting bores therethrough,
         (4) a second edge,
         (5) an inner surface, and
         (6) an outer surface,
      b) a union plate having:
         (1) a lower end,
         (2) an upper end,
         (3) an inner surface and an outer surface, with each surface having a set of bearing mounting bores therethrough, and
      c) a lower counterbalance and coil clamp comprising:
         (1) a motor shaft bore
         (2) a magnetic shaft bore,
         (3) an inner surface,
         (4) an outer surface,
      d) an upper counterbalance and coil clamp comprising:
         (1) a motor shaft bore,
         (2) a magnetic shaft bore,
         (3) an inner surface
         (4) an outer surface,
         (5) a universal ball joint mounting structure that is attached to the outer surface, wherein the structure is dimensioned to rotatably accept a U-joint that is attached to the upper end of the strut assembly,
      e) a counterbalance subassembly comprising:
         (1) a counterbalance split clamp having a sleeve opening and a clamp mounting tab, wherein the mounting tab is attached by bolts that are inserted through a set of tab mounting bores and a set of clamp mounting bores that are located on the first edge of said trunnion plate,
         (2) a counterbalance sleeve made of a ferrous material, and having an outside diameter and an inside diameter, wherein the outside diameter of the sleeve is dimensioned to be rigidly held within the sleeve opening,
         (3) a magnetic shaft having a lower end that is attached by a bolt inserted into the magnetic shaft bore located on said lower counterbalance and coil clamp, an upper end that is attached by a bolt inserted into the magnetic shaft bore located on said upper counterbalance and coil clamp, wherein the magnetic shaft has a diameter that allows the shaft to be concentrically maintained within an air gap located around the sleeve's inside diameter,
      d) a servo motor subassembly comprising:
         (1) an ironless motor coil having a shaft opening therethrough,
         (2) a magnetic motor shaft that is inserted into the shaft opening, wherein the shaft has an upper end that is inserted into the upper motor shaft bore located on the upper counterbalance and coil clamp, and a lower end that is inserted into the lower motor shaft bore located on the lower counterbalance and coil clamp,
      e) a bearing and encoder subassembly comprising:
         (1) an encoder bearing plate having an inner surface, an outer surface and an inner slot, wherein the inner slot is dimensioned to slideably accept and maintain the second edge located on said trunnion plate,
         (2) a linear bearing having an inner surface and an outer surface, wherein the outer surface interfaces with the inner surface of the encoder bearing plate, and the inner surface of the linear bearing interfaces with the outer surface of said union plate,
         (3) an encoder that interfaces with an encoder tape that is located adjacent to the flat linear bearing, wherein said encoder is attached to the inner surface of the encoder bearing plate, and D. an electronics circuit having means for controlling the position of said struts.

2. The system as specified in claim 1 wherein said means for attaching said base plate to a flat surface comprises a plurality Of attachment bores that are dimensioned to receive a plurality of bolts and nuts that interface with the flat surface.

3. The system as specified in claim 1 wherein said linear bearing is selected from the group consisting of a flat linear bearing, a linear ball-bushing shaft bearing, profile rails, crossed roller bearings, a ball spline, bushings, cam style bearing assemblies and v-cam style bearing assemblies.

* * * * *